United States Patent [19]

Hirose et al.

[11] Patent Number: 5,002,403
[45] Date of Patent: Mar. 26, 1991

[54] LINEAR BALL BEARINGS

[75] Inventors: Kazuya Hirose, Tokyo; Kusuya Ozaki, Saitama Prefecture, both of Japan

[73] Assignee: Hihaisuto Seiko Kabushiki Kaisha, Tokyo, Japan

[21] Appl. No.: 70,863

[22] Filed: Jul. 7, 1987

[30] Foreign Application Priority Data

Jul. 30, 1986 [JP] Japan ................................ 61-179389

[51] Int. Cl.⁵ ............................................. F16C 29/06
[52] U.S. Cl. ...................................................... 384/43
[58] Field of Search ................ 384/43, 526, 45, 44, 384/903

[56] References Cited

U.S. PATENT DOCUMENTS

| | | |
|---|---|---|
| 3,586,405 | 6/1971 | Claesson ............................ 384/526 |
| 4,123,121 | 10/1978 | Ernst et al. .......................... 384/43 |
| 4,451,098 | 5/1984 | Farley et al. ........................ 384/526 |

*Primary Examiner*—Lenard A. Footland
*Attorney, Agent, or Firm*—Wenderoth, Lind & Ponack

[57] ABSTRACT

A linear ball bearing has a bearing proper in sliding engagement with a guide member through a plurality of balls. The bearing proper is made up of an intermediate member and a pair of end members each of which is provided on a respective end of the intermediate member. The intermediate member in turn is provided with at least one holding hole and a holding groove associated with each holding hole. The holding groove has a slit which is open to and extends along the surface of the intermediate member. Each of the end members has a transfer groove open between a respective holding hole and a respective holding groove. The holding hole, the holding groove and the transfer grooves collectively define a ball circulating passageway through which a plurality of balls are circulated. The diameter of the holding holes and the holding grooves is slightly larger than the diameter of the balls to allow the balls to circulate therethrough while the width of the slit is narrower than the diameter of the balls such that the balls are retained in the holding grooves within the bearing proper while protruding from the bearing proper through the slits to contact and slidingly engage with the guide member.

7 Claims, 4 Drawing Sheets

FIG. I(a)
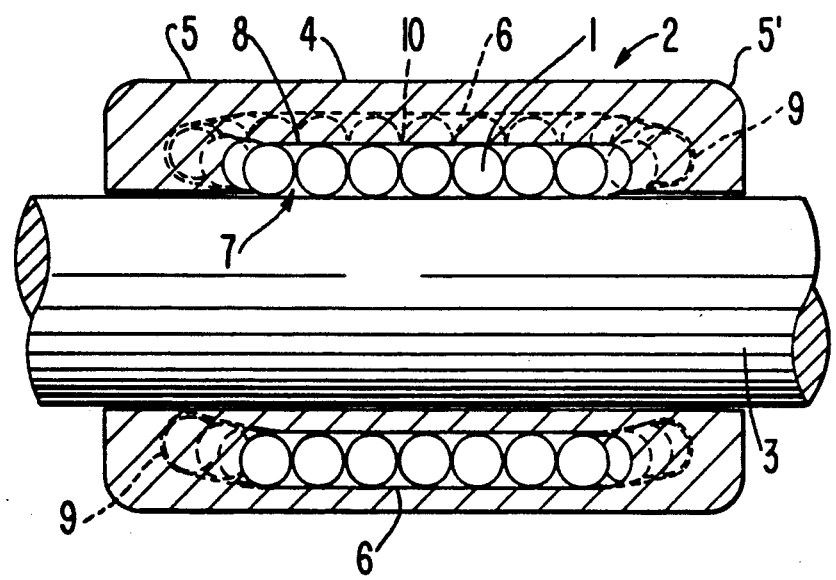
FIG. I(b)
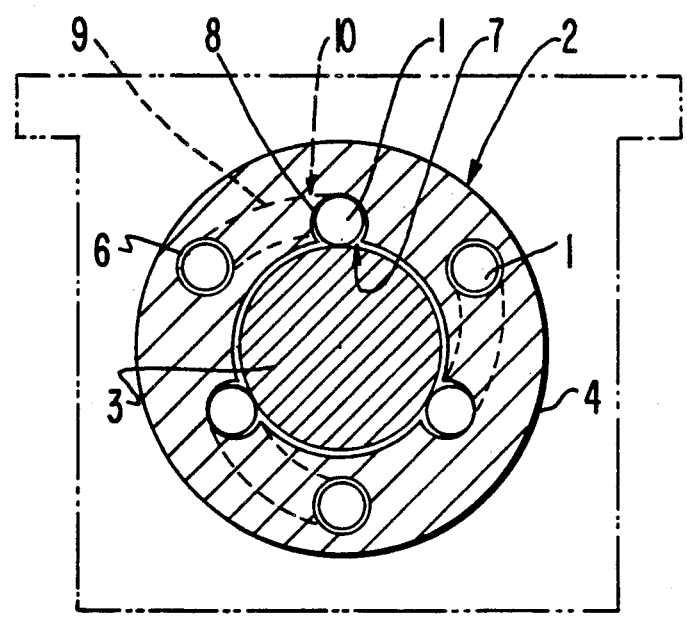

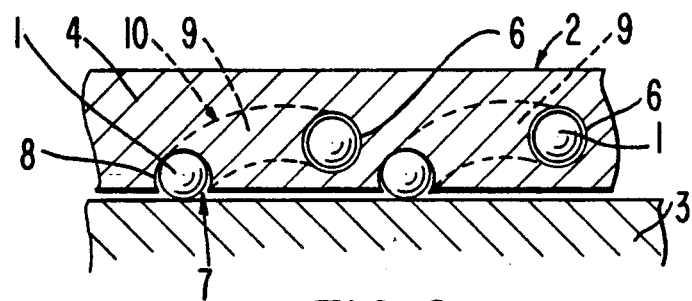
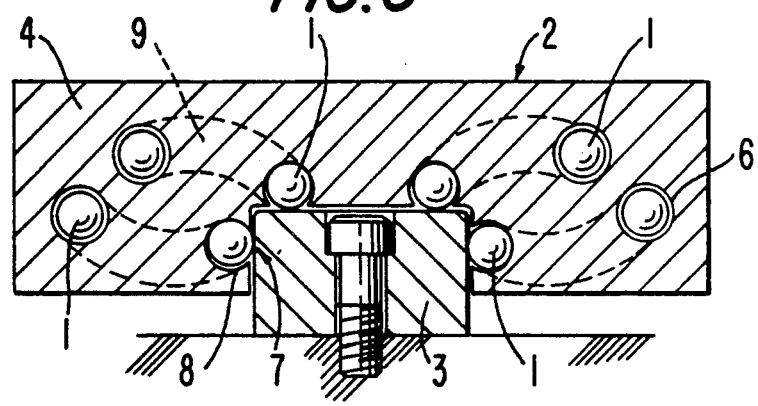
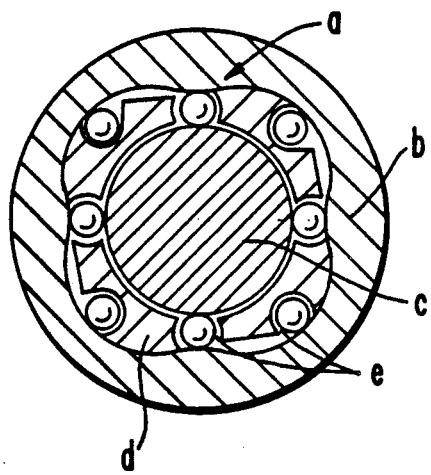
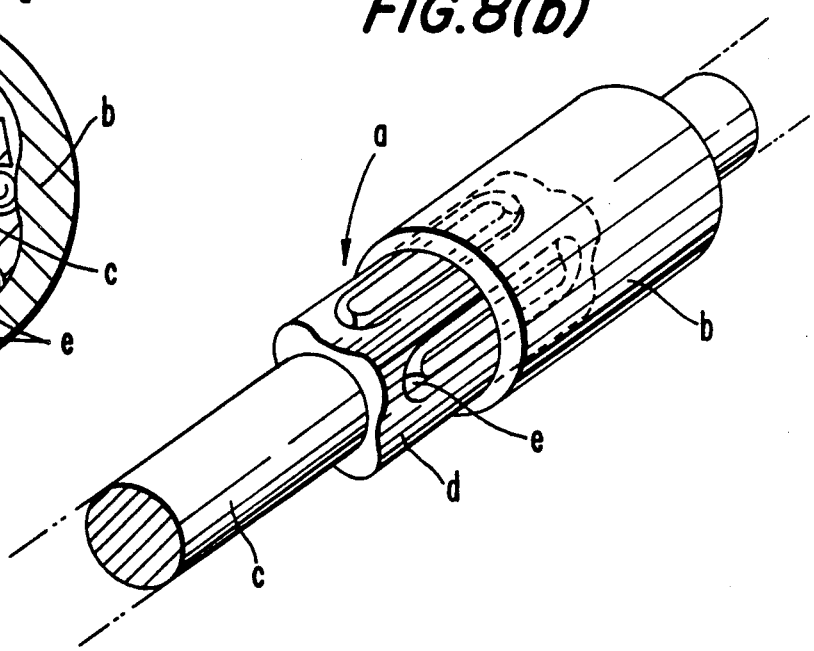

LINEAR BALL BEARINGS

BACKGROUND OF THE INVENTION

1. Field of the Invention

The present invention relates to linear ball bearings of which a bearing member is slidable relative to a guide member in a linear direction. Such bearings are used in various apparatuses such as automated office equipment.

2. Description of the Related Art

Recent improvements in office automation equipment to increase the speed and precision at which the equipment operates are the result of employing linear ball bearings in various sliding portions of the equipment. Accordingly, there has been a demand for a further reduction in the size, weight, price, and noise produced during operation of such linear ball bearings.

A conventional linear ball bearing of the type described above comprises a bearing member in which a plurality of balls are circulatably movable through circulation passages, and a guide member contacting the bearing member through the balls. Each of the circulation passages in turn is comprised of an idly moving portion, a loaded moving portion contacting the guide member and respective transfer portions for communicating the idly moving portion and the loaded moving portion for allowing recirculation of the balls. Accordingly, there has been a problem in that it is difficult to manufacture such complex passages by employing an integral molding process.

For this reason, a conventional bearing has, for example as shown in FIGS. 8(a) and 8(b), a holder d comprised of metal, plastic or any other suitable material in which circulation passages e are formed, a barrel b formed of metal or any other suitable material and a shaft c in this case employed as a guide. The bearing also comprises a means (not shown) for fastening the holder d at a predetermined position within the barrel b.

Such a conventional bearing has a drawback in that the holder d is difficult to manufacture and requires a complex assembly process. These difficulties result in limitations to which the size and production cost of the bearing can be reduced.

SUMMARY OF THE INVENTION

An object of the present invention is to solve the problems associated with conventional linear ball bearings as discussed above by providing an integral holder and barrel as part of the bearing.

More specifically, the present invention comprises a bearing proper which in turn is comprised of an intermediate member and respective end members provided on both sides of the intermediate member. The intermediate member has respective pairs of holding holes and spaced apart holding grooves which by themselves are not in communication with each other but which together define part of a ball circulating passage. The end members have transfer grooves communicating the holding holes with the holding grooves. Therefore, the intermediate member and the end members can be manufactured easily by an integral molding process and can subsequently be easily machined as required after molding and thus, simple fabrication of the bearing proper is facilitated. Furthermore, the intermediate member and the end members can be formed from various materials such as ceramics, plastics and metals. Such a simple manufacturing process can assure large reductions in cost and the material from which the intermediate member and the end members are formed can be selected to achieve a light weight and low noise producing linear bearing.

Furthermore, according to the present invention, the holding grooves of the bearing proper have a diameter that is slightly larger than the diameter of the balls and are open at a slit extending along the surface of the bearing proper, the slit having a width that is narrower than the diameter of the balls such that the balls are retained within the holding grooves and are prevented from falling out of the bearing proper, and thus the load capacity of the bearing is high.

BRIEF DESCRIPTION OF THE DRAWINGS

The present invention will be better understood by those versed in the art by referring to the following description taken in conjunction with the attached FIGURES in which:

FIG. 1(a) is a central longitudinal sectional view of a first embodiment of the present invention;

FIG. 1(b) is a transverse sectional view of the first embodiment of the present invention with a modification of that embodiment indicated in phantom;

FIG. 6 is a transverse sectional view of a further embodiment of the present invention;

FIG. 7 is a transverse sectional view of still another embodiment of the present invention;

FIG. 8(a) is a transverse sectional view of a conventional linear ball bearing; and FIG. 8(b) is a perspective view of such a conventional linear ball bearing.

DETAILED DESCRIPTION OF THE PREFERRED EMBODIMENTS

Figure 2A:
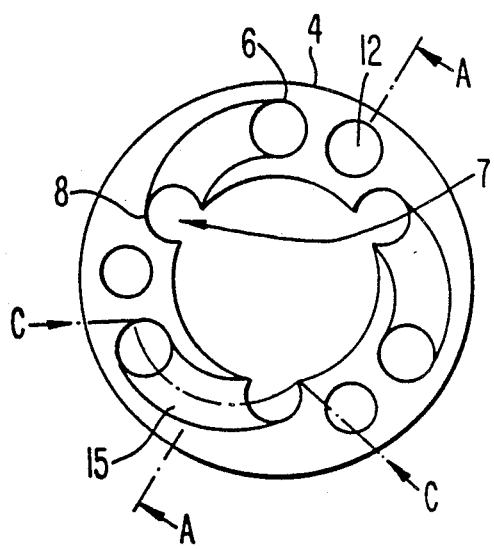
FIG. 2(a) is a front end view of an intermediate member of the first embodiment of the present invention.
Figure 2B:
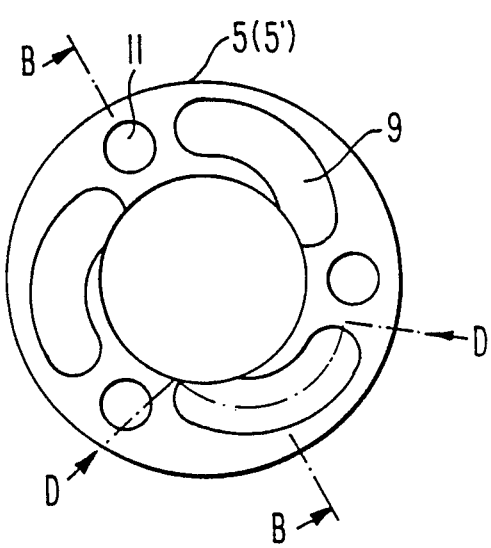
FIG. 2(b) is a front end view of an end member of the first embodiment of the present invention.

Referring to FIGS. 1 to 7 the present invention is comprised of a bearing proper 2 through which a plurality of balls 1 are circulated and a guide member 3 in sliding engagement with the bearing proper 2 via said balls. The bearing proper 2 in turn is comprised of an intermediate member 4 and respective end members 5 and 5' provided on both ends of the intermediate member, the end members 5 and 5' lying in the direction of relative sliding movement between the bearing proper 2 and the guide member 3. The intermediate member 4 has a plurality of holding holes 6 extending therethrough which are slightly larger in diameter than the balls 1 and with a plurality of holding grooves 8 each of which is associated with one of said holding holes 6, the holding holes 8 also being slightly larger in diameter than the balls 1. A slit 7 is open to a surface of the intermediate member 4, said surface being in sliding engagement with the guide member 3. The slit 7 is narrower than the diameter of the balls 1 and thus serves to retain the balls within the holding grooves 8 while allowing the balls to contact the guide member 3 for ensuring relative sliding movement between the guide member 3 and the bearing proper 2. The end members 5 and 5' have respective transfer grooves 9 which are open between respective ones of the holding holes 6 and respective ones of the holding grooves 8 thereby communicating the holding holes 6 with the holding grooves 8. The end members 5 and 5' are fastened to both ends of the intermediate member 4 and when so fastened the holding holes 6, holding grooves 8 and respective pairs of transfer grooves 9 define ball circulation passages 10 through which the balls 1 circulate during use of the linear ball bearing.

The above-described components of the present invention will now be described in more detail with respect to the specific embodiments of the present invention.

In the embodiments shown in FIGS. 1 to 5, the guide member 3 comprises a shaft and the bearing proper 2 comprises a pipe-shaped member loosely engaged with and extending around the shaft. The pipe can have a cylindrical shape or the like as shown by the solid lines in FIG. 1(b) or can have a square shape as shown by the phantom lines in FIG. 1(b). Of course, the bearing proper 2 can have any other appropriate form.

In the embodiment shown in FIG. 6 the guide member 3 comprises a track extending from a plane and bearing proper 2 engages and slides along the track.

In the embodiment shown in FIG. 7, the guide member 3 comprises a planar surface and the bearing proper 2 has a planar surface engaging and sliding along the guide member 3. As can be seen from these various embodiments, the bearing proper and the guide member 3 can have appropriate shapes to suit the respective sliding portions of the structures in which they are employed.

Figure 3B:
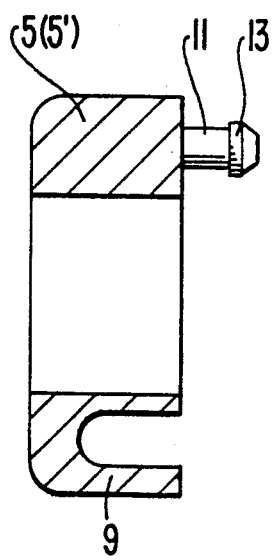
FIG. 3(b) is a partial sectional view taken along line B—B of FIG. 2(b)
Figure 3A:
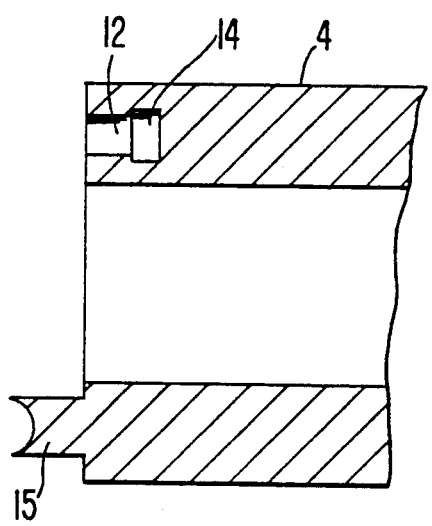
FIG. 3(a) is a partial sectional view taken along line A—A of FIG. 2(a)
Figure 4B:
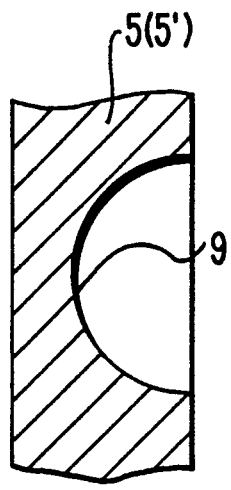
FIG. 4(b) is a partial sectional view taken along line D—D of FIG. 2(b)
Figure 4A:
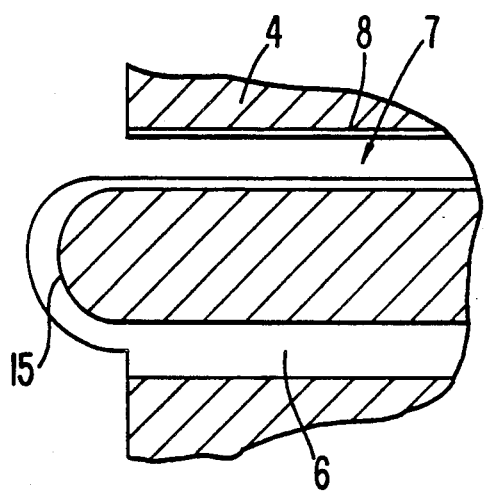
FIG. 4(a) is a partial sectional view taken along line C—C of FIG. 2(a)
Figure 5B:
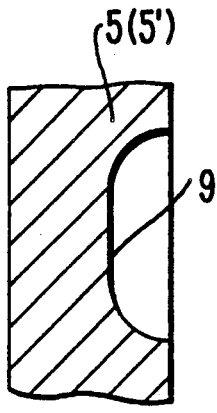
FIG. 5(b), is a partial sectional view of that embodiment corresponding to the view shown in FIG. 4(b)
Figure 5A:
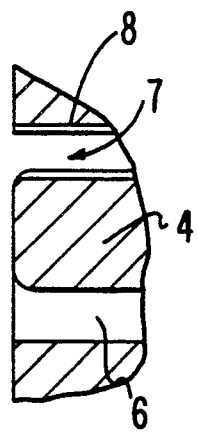
FIG. 5(a), is a partial sectional view of another embodiment of the present invention corresponding to the view shown in FIG. 4(a)

The end members 5 and 5' can be fastened to the intermediate member 4 by bolts or the like. As an alternative, as shown in FIGS. 3(a) and 3(b) either the intermediate member 4 or the end members 5 and 5' can be provided with protrusions 11 for engaging holes 12 provided in the other of said member(s). The protrusions 11 and holes 12 also serve as a means for positioning the end members 5 and 5' relative to the intermediate member 4. In such a structure, a collar 13 can be provided at the tip of each of the protrusions 11 and the recess 14 can be formed with each of the holes 12. The collars 13 can be made of an elastically deformable material which can deform to pass through holes 12 until they engage in recesses 14 to secure the end members 5 and 5' to the intermediate member 4.

Furthermore, the intermediate member 4 and the end members 5 and 5' can be formed as respective integral members by molding and subsequent machining such as partial cutting, grinding, lapping, super finishing, or electric discharge machining, etc. The material from which these members are formed can be selected from a group comprising ceramics, plastics, and metals, etc.

Moreover, such a manufacturing process provides for easy formation of the transfer grooves 9 and the end members 5 and 5'. As shown in FIGS. 4(a), 4(b), 5(a) and 5(b), the transfer grooves of the ball circulation passages can be defined by recesses extending within the end members 5 and 5', respectively, and corresponding protrusions 15 which extend into the grooves when the end members 5 and 5' are fastened to the ends of the intermediate member 4.

In the above-described present invention, a suitable number of balls 1 are placed in the holding holes 6, holding grooves 8 and transfer grooves 9 which together define the ball circulation passages 10 and the end members 5 and 5' are fastened to both ends of the intermediate member 4. In this state, the balls 1 in the holding grooves 8 are partially exposed through the slits 7, but since the width of the slits 7 is less than the diameter of the balls 1, the balls 1 are retained within the bearing proper 2 even when the bearing proper 2 is not in engagement with the guide member 3.

When the bearing proper 2 is engaged with the guide member 3, the bearing proper 2 contacts the guide member 3 through the balls 1 in the holding grooves 8. The circulation of the balls through the ball circulation passages 10 allows the bearing proper 2 to move relative to the guide member 3 with low friction therebetween. The balls 1 moving through the holding grooves 8 are circulated to the holding holes 6 through ones of the transfer grooves 9 and are subsequently refed to the holding grooves 8 through the others of the transfer grooves 9. Thus, the balls 1 circulate through the ball circulation passages 10. The load applied to the balls 1 from the guide member 3 is transmitted to the portions of the bearing proper 2 defining the holding grooves 8 and since such a portion is large, i.e. since the contact area between the holding grooves 8 and the balls 1 is large, the load capacity of the bearing is high.

Note, the present invention is not intended to be limited to the specific embodiments described above. Rather, all limitations which fall within the scope of the appended claims are intended to be embraced by the true spirit and scope of the invention.

We claim:

1. A linear ball bearing comprising:
   a guide member extending in a first direction;
   a bearing proper having a surface in sliding engagement with said guide member, said bearing proper and said guide member being slidable relative to one another in said direction;
   said bearing proper comprising a unitary intermediate member having first and second ends, at least one holding groove extending in said unitary intermediate member, each said holding groove including a slit extending along and open to said surface, a respective holding hole extending through said unitary intermediate member and spaced from and paired with each of said at least one holding grooves, first and second end members fixed to said unitary intermediate member and extending along said first and second ends of said intermediate member respectively, each of said first and second end members having a respective transfer groove extending therein between and open to each said holding hole and said holding groove paired therewith for placing said holding hole and said holding groove paired therewith in communication with each other,
   each said at least one holding hole, said holding groove paired therewith and said respective transfer grooves of said first and said second end members collectively defining a respective ball circulation passage; and a plurality of balls provided in and circulatable through each said respective ball circulation passage, said balls having a diameter that is slightly less than the diameter of said holding groove, and the width of said slit being less than the diameter of said balls such that said balls are retained in said holding groove while protruding from said bearing proper through said slit for contacting said guide member along a portion thereof adjacent said surface.

2. A linear ball bearing as claimed in claim 1, wherein said guide member is a shaft, and said bearing proper is tubular and extends around and loosely engages said shaft.

3. A linear ball bearing as claimed in claim 1, wherein said guide member is a track extending from a plane, and said bearing proper contacts and slides along said track.

4. A linear ball bearing as claimed in claim 1, wherein said guide member has a planar surface, and said surface of said bearing proper is planar.

5. A linear ball bearing as claimed in claim 1, wherein one of said intermediate member and said end members collectively, have protrusions extending therefrom and the other of said intermediate member and said end members has/have holes extending therein, said protrusions extending within and engaging with said holes for positioning and for fastening said end members to said intermediate member.

6. A linear ball bearing as claimed in claim 1, wherein said intermediate member and each of said end members are all comprised of one of a group comprising a ceramic, a plastic and a metallic material.

7. A linear ball bearing as claimed in claim 1, wherein each said transfer groove of said end members is defined by a recess open to respective outer surfaces of said end members, and a respective protruding portion extending from said intermediate member into said recess.

* * * * *